May 17, 1938. L. HEIDGER Re. 20,725

ELECTRIC FENCE

Original Filed Feb. 11, 1935

INVENTOR
Leonard Heidger
BY
Eugene H. Simpson
ATTORNEY

Reissued May 17, 1938 Re. 20,725

UNITED STATES PATENT OFFICE 20,725

ELECTRIC FENCE

Leonard Heidger, West Allis, Wis., assignor to Edwin J. Gengler, Milwaukee, Wis.

Original No. 2,090,198, dated August 17, 1937, Serial No. 5,951, February 11, 1935. Application for reissue October 2, 1937, Serial No. 166,978

6 Claims. (Cl. 256—10)

This invention relates to a stock fence using electricity to prevent animals from rubbing against the fence and breaking it.

One type of electric fence now in use employs a relatively strong current with a thermally operated circuit breaker which will automatically disconnect the current for sufficient time to enable the animal to free itself. This type of electric fence has been found to be unsatisfactory as it gives the animal too severe a shock when the current is flowing and time to break the fence while the current is disconnected.

A second type of electric fence employs an induction coil, or spark coil. The ordinary spark coil employed has an interrupter which vibrates rapidly and draws a constant heavy current of electricity which gives the animal too severe a shock.

One object of the present invention is to produce an electric fence which with a minimum amount of electricity will give an animal a shock sufficient to cause it to back away or avoid the fence, but not severe enough to cause the animal any harm.

Another object is to produce an electric fence in which the severity of the shock may be varied to suit different animals or changes in weather conditions.

A further object is to produce an electric fence which is adapted to operate on either alternating or direct current.

Other objects are to reduce the cost of manufacture, operation and erection of fences, and increase the efficiency of the fence.

These objects are accomplished by means of a transformer having one side thereof connected to a fence wire and having a current breaker comprising a magnetically actuated pendulum to make and break the circuit through the transformer and send timed electrical pulsations through the transformer and on to the fence wire.

The drawing shows one form of apparatus falling within the terms of the invention.

Figure 1:
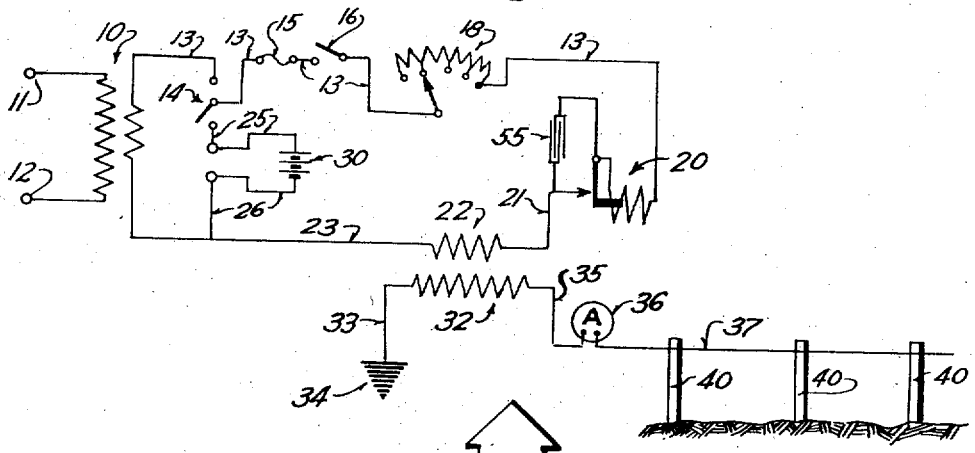
Fig. 1 is a diagrammatic view of the apparatus embodying the invention.
Figure 2:
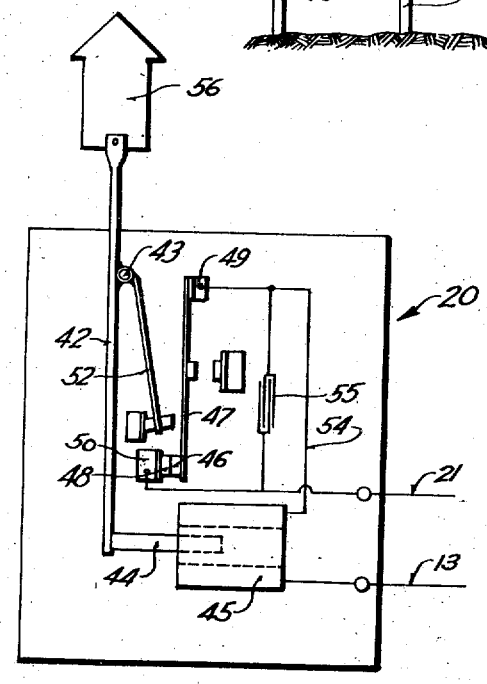
Fig. 2 is a plan view of the current interrupter.

The apparatus shown in Fig. 1 comprises a step-down transformer 10 which may connect through contacts 11 and 12 to a regular 110 volt alternating current outlet, and supplies current through a wire 13, a single pole, double throw switch 14, a fuse 15, and a snap switch 16, to a rheostat 18, the rheostat 18 being variable to regulate the current in the circuit 13. From the rheostat 18 the current flows through the wire 13 to one side of a current interrupter 20 which is shown in Fig. 2 and will be described in detail below. From the interrupter 20 the current flows through a wire 21, to the primary 22 of an induction coil and returns to the transformer 10 through a wire 23.

The secondary, or high tension winding 32 of the induction coil has one side 33 grounded as at 34, while the other side connects to a wire 35 running through a milli-ammeter 36 to a bare fence wire 37. This connection gives a normally open secondary circuit which is closed through the body of an animal when the animal contacts the fence wire. The fence wire 37 is supported a suitable distance above the ground by spaced non-metallic fence posts 40, in the usual manner.

The milli-ammeter indicates the condition of the fence and the leakage between the fence and the ground. It thus forms a guide to set the rheostat 18. The milli-ammeter also indicates when animals touch the fence as it registers a greater flow of current when they are in contact with the fence.

Where 110v.—A. C. is not available the switch may be thrown to complete the circuit through wires 25 and 26 to a battery 30.

The current interrupter 20 is shown in detail in Fig. 2 and comprises an arm 42 pivoted on a pin 43, a soft iron plunger 44 which together form a pendulum, a solenoid 45 and a movable contact 46 mounted on a spring 47, and normally in contact with a fixed contact 48 under influence of spring 47 to close the circuit through the primary 22 of the induction coil.

The spring contact arm 47 is fastened to the base of the interrupter 20 through a bracket 49, while a second bracket 50 carries the stationary contact 48.

A second spring arm 52 is pivoted to the pin 43 and moves in unison with the arm 42 to separate the contacts 46 and 48.

The current enters through the wire 13 flows through the solenoid 45 and the wire 54, through the spring arm 47 through the contacts 46 and 48 and out through the wire 21.

When the switch 16 is closed current flows through the solenoid 45 which draws the plunger 44 into the solenoid. When the plunger 44 is drawn into the solenoid 45, the arm 52 disengages the contacts 46 and 48 at the beginning of its swing to break the circuit. The primary circuit is thus open the larger portion of the plunger swing and is closed but briefly at one point in the swing. The current used is therefore only sufficient to supply the losses of the coil and the energy required to maintain the pendulum in motion.

A condenser 55 may be interposed across the contacts 46 and 48 to prevent sparking. The interrupter 20 also acts as a choke coil to limit the flow of current to the coil 22—32.

The rate of vibration of the interrupter 20 is relatively slow due to the design of the coil 45 and the heavy plunger 44. The slow rate of current interruptions effects a considerable saving of electricity and makes possible the economical use of a dry battery or a storage battery at 30, which is not possible when a coil with the usual vibrator is employed.

The entire apparatus described above with the exception of the fence is enclosed in a box (not shown) which may be conveniently located relative to the fence and the source of electricity. An indicator 56 may be fastened on the arm 42, and project through the box so that the operation of the apparatus may be observed from a distance.

The foregoing structure is subject to various changes and modifications without departing from the essence of the invention, and it is not, therefore, desired to limit the invention to the precise form herein shown and described, but only by the scope of the appended claims.

The invention described above is hereby claimed as follows:

1. An electric fence of the character described comprising: a fence wire; a primary circuit; a source of electric current in said primary circuit; a transformer including a primary coil connected in said primary circuit, and a secondary coil; an interrupter comprising a pair of contacts connected in said primary circuit to close the same, and a magnetically propelled weight constrained to recurrent movement in a fixed path and adapted to control engagement of said contacts with each other, said magnetically propelled weight being so connected with the contacts that engagement thereof is limited to a brief part of the time required for the weight to move through a complete cycle, whereby the primary circuit and the transformer are cyclically and momentarily energized; and means for connecting one end of the secondary coil to the ground and the other end thereof to said fence to constitute a normally open secondary circuit.

2. An electric fence of the character described comprising: a fence wire; a primary circuit; a source of electric current in said primary circuit; a transformer including a primary coil connected in said primary circuit, and a secondary coil; a magnetically actuated interrupter comprising a pair of contacts connected in said circuit to close the same, a magnetically actuated pendulum, and means for transmitting motion of the pendulum to one of the contacts so that as the pendulum swings through its recurrent path, engagement and disengagement of the contacts is effected with the contacts engaged during a short interval of the time required for the pendulum to swing through a complete cycle and disengaged for the remainder of said time, whereby closure of the primary circuit is intermittent and brief; and means for connecting one end of the secondary coil to the ground and the other end thereof to the fence wire to constitute a normally open secondary circuit.

3. An electric fence of the character described comprising: a fence wire; a transformer having a primary and a secondary; means for connecting one end of the secondary with the fence wire and the other end thereof with the ground so as to constitute a normally open secondary circuit; a primary circuit including the primary of the transformer, a source of electric current connected in the primary circuit, and an interrupter for periodically and briefly closing the primary circuit to energize the transformer comprising a pair of contacts engageable to close the primary circuit; a weighted actuator recurrently movable in a fixed path and operably associated with one of the contacts to time its engagement with the other contact and effect engagement of the contacts during only a brief portion of the travel of the weighted actuator; and electromagnetic means for driving the weighted actuator.

4. An electric fence as defined in claim 1 including means in one of the circuits to regulate the strength of the charge on the fence.

5. An electric fence as defined in claim 2 including means in one of the circuits to regulate the strength of the charge on the fence.

6. An electric fence of the character described comprising: a fence wire; a transformer having a primary and a secondary; means for connecting one end of the secondary with the fence wire and the other end thereof with the ground so as to constitute a normally open secondary circuit; a primary circuit including the primary of the transformer, a storage battery connected in the primary circuit, and an interrupter for periodically and briefly closing the primary circuit to energize the transformer comprising a pair of contacts engageable to close the primary circuit; a weighted actuator recurrently movable in a fixed path and operably associated with one of the contacts to time its engagement with the other contact and effect engagement of the contacts during only a brief portion of the travel of the weighted actuator; and electromagnetic means for driving the weighted actuator.

LEONARD HEIDGER.